(12) United States Patent
Futaki

(10) Patent No.: US 12,167,426 B2
(45) Date of Patent: *Dec. 10, 2024

(54) MACHINE-TO-MACHINE (M2M) TERMINAL, BASE STATION, METHOD, AND COMPUTER READABLE MEDIUM

(71) Applicant: NEC Corporation, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,278

(22) Filed: Sep. 13, 2022

(65) Prior Publication Data
US 2023/0007647 A1 Jan. 5, 2023

Related U.S. Application Data

(63) Continuation of application No. 16/886,502, filed on May 28, 2020, now abandoned, which is a
(Continued)

(30) Foreign Application Priority Data

Jan. 30, 2014 (JP) .................................. 2014-015866

(51) Int. Cl.
*H04W 4/70* (2018.01)
*H04W 16/00* (2009.01)
(Continued)

(52) U.S. Cl.
CPC ............. *H04W 72/51* (2023.01); *H04W 4/70* (2018.02); *H04W 16/00* (2013.01); *H04W 48/16* (2013.01);
(Continued)

(58) Field of Classification Search
CPC ....... H04W 72/51; H04W 4/70; H04W 76/10; H04W 16/00; H04W 48/16; H04B 7/24; H04B 7/26
See application file for complete search history.

(56) References Cited

U.S. PATENT DOCUMENTS 9,735,942 B2 8/2017 Xu et al.
9,758,056 B2 9/2017 You et al.
(Continued)

FOREIGN PATENT DOCUMENTS

CN 102118835 A 7/2011
CN 102436308 A 5/2012
(Continued)

OTHER PUBLICATIONS

Chinese Office Communication for CN Application No. 201910426889.2 mailed on Sep. 23, 2021 with English Translation.
(Continued)

*Primary Examiner* — Dai Phuong
(74) *Attorney, Agent, or Firm* — Sughrue Mion, PLLC

(57) ABSTRACT

A Machine-to-machine (M2M) terminal (11) is configured to receive a first notification from a base station (13) and to transmit a second notification to the base station (13) when establishing a radio connection with the base station (13) after reception of the first notification or while performing a procedure for establishing a bearer between the M2M terminal (11) and a core network (14) after reception of the first notification. The first notification indicates whether specific coverage enhancement processing is supported in a cell (130) of the base station (13) in which the M2M terminal (11) is located. The second notification indicates that the specific coverage enhancement processing is required or being executed by the M2M terminal (11). It is thus possible to provide an improvement to allow the M2M terminal to
(Continued)

determine necessity of special coverage enhancement processing for M2M terminals.

11 Claims, 7 Drawing Sheets

Related U.S. Application Data continuation of application No. 16/526,735, filed on Jul. 30, 2019, now Pat. No. 10,764,899, which is a continuation of application No. 15/855,717, filed on Dec. 27, 2017, now Pat. No. 10,440,718, which is a continuation of application No. 15/114,714, filed as application No. PCT/JP2014/004541 on Sep. 4, 2014, now Pat. No. 10,356,790.

(51) Int. Cl.
    *H04W 48/16* (2009.01)
    *H04W 72/51* (2023.01)
    *H04W 76/10* (2018.01)
    *H04B 7/24* (2006.01)
    *H04B 7/26* (2006.01)

(52) U.S. Cl.
    CPC .............. *H04W 76/10* (2018.02); *H04B 7/24* (2013.01); *H04B 7/26* (2013.01)

(56) References Cited

U.S. PATENT DOCUMENTS

| | | | |
|---|---|---|---|
| 2009/0176490 A1 | 7/2009 | Kazmi et al. | |
| 2012/0163235 A1* | 6/2012 | Ho | H04W 52/383 370/254 |
| 2012/0184204 A1 | 7/2012 | Kazmi et al. | |
| 2013/0039317 A1 | 2/2013 | Jamadagni et al. | |
| 2013/0208673 A1 | 8/2013 | Petermann et al. | |
| 2014/0056193 A1 | 2/2014 | Huang et al. | |
| 2014/0098761 A1* | 4/2014 | Lee | H04L 5/0055 370/329 |
| 2014/0198772 A1 | 7/2014 | Baldemair et al. | |
| 2014/0204866 A1 | 7/2014 | Siomina et al. | |
| 2014/0302855 A1 | 10/2014 | Nory et al. | |
| 2014/0323124 A1 | 10/2014 | Tanaka et al. | |
| 2015/0016312 A1 | 1/2015 | Li | H04L 5/14 370/280 |
| 2015/0049712 A1* | 2/2015 | Chen | H04W 74/0833 370/329 |
| 2015/0117410 A1* | 4/2015 | Wu | H04W 36/0069 370/329 |
| 2015/0131599 A1 | 5/2015 | Xue et al. | |
| 2015/0173105 A1* | 6/2015 | Bergstrom | H04L 5/0092 370/329 |
| 2015/0189889 A1 | 7/2015 | Wang et al. | |
| 2015/0215911 A1 | 7/2015 | Dimou et al. | |
| 2015/0304080 A1 | 10/2015 | Yi et al. | |
| 2016/0029379 A1 | 1/2016 | Kuchibhotla et al. | |
| 2016/0088595 A1 | 3/2016 | You | |
| 2016/0142981 A1 | 5/2016 | Yi et al. | |
| 2016/0198390 A1 | 7/2016 | Aminaka et al. | |
| 2016/0227580 A1 | 8/2016 | Xiong et al. | |
| 2016/0270000 A1 | 9/2016 | Nix | |
| 2016/0270057 A1 | 9/2016 | Yu et al. | |
| 2016/0337991 A1 | 11/2016 | Zhang et al. | |
| 2017/0105127 A1 | 4/2017 | Xiong et al. | |
| 2017/0135026 A1 | 5/2017 | Frenger et al. | |
| 2017/0171784 A1 | 6/2017 | Dimou et al. | |
| 2017/0230840 A1 | 8/2017 | Chen et al. | |
| 2018/0014278 A1 | 1/2018 | Papasakellariou et al. | |
| 2019/0090219 A1 | 3/2019 | Lee | H04W 72/005 |
| 2019/0261421 A1 | 8/2019 | Peiss et al. | |
| 2019/0342857 A1 | 11/2019 | Basu Mallick et al. | |
| 2019/0380045 A1 | 12/2019 | Sha et al. | |

FOREIGN PATENT DOCUMENTS

| | | |
|---|---|---|
| CN | 102870486 A | 1/2013 |
| WO | 2011/139043 2 | 11/2011 |
| WO | 2012/150801 A2 | 11/2012 |
| WO | WO 2013/149666 A1 | 10/2013 |
| WO | WO 2018/024947 A1 | 2/2018 |

OTHER PUBLICATIONS

Ericsson, ST-Ericsson, "Required functionality for coverage enhancements for MTC", 3GPP TSG-RAN WG1 Meeting #71, R1-124888, Nov. 3, 2012, USA.
"New trend for the research of mobile communication standardization", Dec. 31, 2013, pp. 27-51.
Rapeepat Ratasuk et al., "Coverage and Capacity Analysis for Machine Type Communications in LTE", 2012 IEEE 75th Vehicular Technology Conference(VTC Spring), Jul. 16, 2012.
Office Action issued on Oct. 20, 2020, by the Japanese Patent Office in counterpart Japanese Patent Application 2019-106829.
Office Action issued on Jun. 22, 2020, by the European Patent Office in counterpart European Patent Application 20165198.1.
LG Electronics: "RACH procedure for coverage enhancement of MTC UEs", 3GPP TSG RAN WG1 #74bis, R1-134393, pp. 1-3, (Sep. 28, 2013).
Office Action issued on Jun. 30, 2020, by the Japanese Patent Office in counterpart Japanese Patent Application 2019-106829.
Non-Final Office Action mailed Aug. 9, 2018, in U.S. Appl. No. 15/584,638.
US Office Action in counterpart U.S. Appl. No. 15/585,832 from the United States Patent and Trademark Office, dated Mar. 16, 2018.
Notice of Allowance issued Jan. 8, 2019 in co-pending U.S. Appl. No. 15/114,714 from the United States Patent and Trademark Office.
Japanese Office Action issued on Feb. 5, 2019, by the Japanese Patent Office in counterpart Japanese Patent Application 2018-117254.
Alcatel-Lucent, Alcatel-Lucent Shanghai Bell; "Coverage Enhancement for PBCH", 3GPP TSG-RAN WG 1 Meeting #74 R1-132972, pp. 1-3, (2013).
NTT Docomo: "Discussion on Multi-Level PRACH Coverage Enhancement" 3GPP TSG RAN WG1 Meeting #74bis R1-134493, pp. 1-5. (2013).
Notification of Reasons for Refusal issued by Japanese Patent Office in counterpart Japanese Patent Application No. 2018-133285, dated Mar. 12, 2019.
Huawei, HiSilicon, "Discussion on PRACH coverage improvement and mechanism for determining the amount of needed coverage improvement", 3GPP TSG RAN WG1 Meeting #74bis, R1-134054, Agenda Item: 7.2.2.2. 6 pages, (Oct. 2013).
R1-135427, MediaTek, Inc., "Discussion on Timing Relationship for (E)PDCCH and PDSCH", 3GPP TSG-RAN WG1 #75, Nov. 11-15, 2013.
Notice of Reasons for Refusal dated May 28, 2019, issued from the Japanese Patent Office in counterpart Japanese Patent Application No. 2018-117254 and an English-language machine translation.
3GPP R1-135943, Vodafone, "Way Forward on P-BCH for MTC enhanced coverage", 3GPP TSG RAN WG1 #75, San Francisco, USA, Nov. 11-15, 2013 (2 pages).
3GPP R1-135944, Vodafone, "Way Forward on PRACH for MTC enhanced coverage", 3GPP TSG RAN WG1 #75, San Francisco USA Nov. 11-16, 2013 (4 pages).
3GPP R1-138001, Vodafone et al. "Way forward on PDCCH, PDSCH, PUCCH and PUSCH for MTC enhanced coverage", 3GPP TSG RAN WG1 #75, San Francisco, USA, Nov. 11-15, 2013 (2 pages).
3GPP TR 36.888 V12.0.0 (Jun. 2013), "3rd Generation Partnership Project: Technical Specification Group Radio Access Network: Study on provision of low-cost Machine-Type Communications (MTC) User Equipments (UEs) based on LTE (Release 12)", Jun. 2013 (pp. 1-55).
3GPP TR 37.868 V11.0.0 (Sep. 2011), "3rd Generation Partnership Project; Technical Specification Group Radio Access Network:

(56) References Cited

OTHER PUBLICATIONS

Study on RAN Improvements for Machine-type Communications; (Release 11)", Sep. 2011 (pp. 1-26).
Ericsson, "Control of Amount of Coverage Enhancement for MTC UE," 3GPP TSG RAN WG1 Meeting #74bis. R1-134848, Guangzhou, China, Oct. 7-11, 2013 (4 pages).
Encsson, "Random Access for Enhanced Coverage MTC UE," 3GPP TSG RAN WG1 Meeting #75, R1-135645, San Francisco, CA, USA. Nov. 11-15, 2013 (4 pages).
Extended European Search Report for European Patent Application No. 14880920 05 dated Sep. 8, 2017 (8 pages).
International Search Report corresponding to PCT/JP2014/004541 mailed Dec. 9, 2014 (one page).
LG Electronics, PBCH and SIB Enhancement for coverage-limiting UEs, 3GPP TSG RAN WG1 Meeting #72bis R1-131296, Apr. 15, 2013 (4 pages).
NTT Docomo, "Discussion on Multi-level PRACH Coverage Enhancement," 3GPP TSG RAN WG1 Meeting #75, R1-135509, San Francisco, USA, Nov. 11-15, 2013 (7 pages).
Qualcomm Incorporated, RACH Channel Design for MTC Coverage Enhancements, 3GPP TSG-RAN WG1 #74bis R1-134606, Oct. 7, 2013 (3 pages).
U.S. Office Action issued by the U.S. Patent and Trademark Office in U.S. Appl. No. 15/114,714 dated Jun. 29, 2017 (42 pages).
ZTE. Coverage Improvement Analysis of PRACH for TR 36.888 and text proposal, 3GPP TSG RAN WG1 Meeting #72bis R1-131054, APr. 15, 2013 (7 pages).

U.S. Non-Final Office Action issued in U.S. Appl. No. 15/584,636, dated Aug. 24, 2017. 10 pages.
Korean Office Action issued by the Korean Intellectual Property Office for Korean Application No. 10-2016-7022285 dated Mar. 14, 2018 (15 pages).
NSN, Nokia, "PRACH Enchancement and Mechanism for Identifying Coverage Shortfall," 3GPP TSG RAN1#74bis, R1-134517, Agenda Item 7.2.2.2.2, Guangzhou, China, Oct. 7-11, 2013 (4 pages).
Japanese Office Action issued by the Japan Patent Office for Japanese Application No. 2015-559620 dated Jun. 12, 2018 (7 pages).
Sony, "Enhanced Coverage Mobility Issues," 3GPP TSG-RAN WG2 Meeting #84, R2-133821, Agenda Item 7.9.2, San Francisco, USA, Nov. 11-15, 2013 (4 pages).
Ericsson, "System information for enhanced coverage MTC UE," 3GPP TSG RAN WG1 Mesting #75, R1-135644, Agenda Item 7.2.2.2.1, San Francisco, CA, Nov. 11-15, 2013 (8 pages).
Extended European Search Report issued by the European Patent Office for European Application No. 18164086.3 dated Jun. 22, 2018 (8 pages).
Office Action issued on Aug. 23, 2019 issued by the Chinese Patent Office in counterpart Chinese Patent Application No. 201710022324.9.
Notice of Preliminary Rejection of the counterpart Korean Patent Application No. 10-2019-7018278, issued by the Korean Intellectual Property Office on Aug. 1, 2019.
Alcatel-Lucent et al.; "PRACH Coverage Enhancement for MT CUE", 3GPP TSG-RAN WG1 Meeting #75, R1-135155, pp. 1-8 (Nov. 2013).

* cited by examiner

MACHINE-TO-MACHINE (M2M) TERMINAL, BASE STATION, METHOD, AND COMPUTER READABLE MEDIUM

CROSS-REFERENCE TO RELATED APPLICATIONS

The present application is a continuation application of U.S. patent application Ser. No. 16/886,502 filed on May 28, 2020, which is a continuation application of U.S. patent application Ser. No. 16/526,735 filed on Jul. 30, 2019, which issued as U.S. Pat. No. 10,764,899, which is a continuation application of U.S. patent application Ser. No. 15/855,717 filed on Dec. 27, 2017, which issued as U.S. Pat. No. 10,440,718, which is a continuation application of U.S. patent application Ser. No. 15/114,714 filed on Jul. 27, 2016, which issued as U.S. Pat. No. 10,356,790, which is a National Stage Entry of international application PCT/JP2014/004541 filed on Sep. 4, 2014, which claims the benefit of priority from Japanese Patent Application 2014-015866 filed on Jan. 30, 2014, the disclosures of all of which are incorporated in their entirety by reference herein.

TECHNICAL FIELD

The present disclosure relates to a radio communication system which performs a communication control in order to enhance coverage.

TECHNICAL FIELD

In the 3GPP Long Term Evolution (LTE), standardization of techniques for improving deterioration of communication quality due to recent sharp increase in mobile traffic and for achieving faster communication has been performed. Further, standardization of techniques for avoiding increase in a control signaling load due to connections of an enormous number of Machine to Machine (M2M) terminals to an LTE network has been performed (Non-Patent Literature 1). The M2M terminals are, for example, terminals that perform communication without human intervention. The M2M terminals are placed in various types of equipment including machines (e.g., vending machines, gas meters, electric meters, vehicles, railway vehicles, and ships) and sensors (e.g., environmental, agricultural, and traffic sensors). In the LTE, communication performed by the M2M terminals are referred to as Machine Type Communications (MTC) and a terminal performing the MTC is referred to as an MTC terminal (MTC User Equipment (MTC UE)).

While M2M service providers need to distribute an enormous number of M2M terminals, there is a limit to the cost allowable for each M2M terminal. Therefore, it is required M2M terminals be implemented at a low cost, and M2M terminals be able to perform communication with low power consumption, for example. Further, in one use case, MTC UEs perform communication while they are fixedly or statically installed in buildings. In this case, the radio quality of MTC UEs may be always low and accordingly coverage enhancement technique is especially needed for MTC devices compared to normal UEs having mobility (e.g., mobile telephones, smartphones, tablet computers, and notebook personal computers (notebook PCs)). Further, functional restrictions contributing to reduction of the cost include, for example, a low maximum transmission power, a small number of reception antennas, no support of high-order modulation schemes (e.g., 64 Quadrature Amplitude Modulation (64 QAM)), and a narrow operating bandwidth (e.g., 1.25 MHz), which lower the maximum transmission rate of MTC UEs. Therefore, in the LTE, standardization of techniques for enhancing communication characteristics of MTC UEs (i.e., coverage), which are expected to be lower than those of normal UE has been performed (Non-Patent Literature 2). In the following description, some examples of the techniques for enhancing coverage of MTC UEs discussed in the LTE are described. It can be said that the coverage enhancement techniques (coverage enhancement processing) for MTC UEs described below are processing for enhancing or improving communication characteristics or communication quality of MTC UEs. The state of a UE to which these special coverage enhancement techniques has been applied is referred to as a coverage enhancement mode (Enhanced Coverage Mode (ECM)).

The ECM can improve, for example, a reception characteristic of a Physical Broadcast Channel (PBCH), a transmission characteristic of a Physical Random Access Channel (PRACH) preamble (i.e., detection characteristic in an eNB), a reception characteristic of a Physical Downlink Shared Channel (PDSCH), and a transmission characteristic of a Physical Uplink Shared Channel (PUSCH). The PBCH is a downlink broadcast channel used by an eNB to transmit broadcast information commonly used within a cell. The PRACH is an uplink physical channel used by a UE for an initial access to a radio base station (eNB). The PDSCH is a downlink physical channel used for data reception by a UE. The PUSCH is an uplink physical channel used for data transmission by a UE.

One processing that is being discussed to improve a reception characteristic of the PBCH is to repeatedly transmit broadcast information on the PBCH a number of extra times as compared to the normal operation by a predetermined number of times (Non-Patent Literature 3). One processing that is being discussed to improve a transmission characteristic of the PRACH is to repeatedly transmit the PRACH (i.e., preamble) a predetermined number of times (Non-Patent Literature 4). Further, one processing that is being discussed to improve a reception characteristic of the PDSCH and a transmission characteristic of the PUSCH is to repeatedly transmit the PDSCH and the PUSCH over multiple subframes (Non-Patent Literature 5). According to the above processing, communication characteristics of MTC UEs that is expected to be lower than that of normal UEs will be improved.

It is expected that the coverage enhancement processing in the ECM is performed for MTC UEs that perform a delay tolerant access. The delay tolerant access is defined as being a new EstablishmentCause that is specified in an RRC Connection Request message and is used, for example, to control an overload. The delay tolerant access is mainly intended for MTC UEs that execute a delay-tolerant MTC application. For example, in a metering service (meter reading service), there is no need to send a metering report to a remote system in real time (or in exact communication cycles) and a long delay may be allowed for the transmission of the metering report. When an eNB imposes overload control on the delay tolerant access, the eNB may reject an RRC Connection Request transmitted by a RRC Connection Request message that contains "EstablishmentCause" indicating the delay tolerant access.

CITATION LIST

Non Patent Literature

[Non-Patent Literature 1] 3GPP TR 37.868 V11.0.0 (2011-09), "3rd Generation Partnership Project; Technical Specification Group Radio Access Network; Study on RAN Improvements for Machine-type Communications; (Release 11)", September, 2011

[Non-Patent Literature 2] 3GPP TR 36.888 V12.0.0 (2013-06), "3rd Generation Partnership Project; Technical Specification Group Radio Access Network; Study on provision of low-cost Machine-Type Communications (MTC) User Equipments (UEs) based on LTE (Release 12)", June, 2013

[Non-Patent Literature 3] 3GPP R1-135943, Vodafone, "Way Forward on P-BCH for MTC enhanced coverage", 3GPP TSG RAN WG1 #75, San Francisco, USA, 11-15 Nov. 2013

[Non-Patent Literature 4] 3GPP R1-135944, Vodafone, "Way Forward on PRACH for MTC enhanced coverage", 3GPP TSG RAN WG1 #75, San Francisco, USA, 11-15 Nov. 2013

[Non-Patent Literature 5] 3GPP R1-136001, Vodafone et al. "Way forward on PDCCH, PDSCH, PUCCH and PUSCH for MTC enhanced coverage", 3GPP TSG RAN WG1 #75, San Francisco, USA, 11-15 Nov. 2013

SUMMARY OF INVENTION

Technical Problem

The present inventor has examined many problems that are caused when the coverage enhancement processing in the ECM is applied to MTC UEs (M2M terminals). For example, while PBCH repetition is commonly applied to MTC UEs in a cell, RACH repetition and PDSCH/PUSCH repetition are separately applied to each MTC UE.

In one example, an eNB may determine whether the ECM, in particular, coverage enhancement processing on a per-MTC-UE basis (e.g., RACH repetition and PDSCH/PUSCH repetition) is required for a specific MTC UE or not. Since PDSCH/PUSCH repetition requires allocation of radio resources by an eNB, it may be reasonable that the necessity of the coverage enhancement processing on a per-MTC-UE basis is determined by the eNB.

On the other hand, however, that the necessity of the ECM is determined by an eNB may cause problems. For example, If an MTC UE cannot start the ECM until an eNB has determined the necessity of the ECM (in particular, the coverage enhancement processing on a per-MTC-UE basis) for this specific MTC UE, the MTC UE cannot benefit from the improvement of communication characteristics by the ECM until the determination in the eNB has been completed. This may cause increase in delay time until the MTC UE becomes able to benefit from the improvement of communication characteristics by the ECM. Accordingly, in the worst case, the MTC UE may fail the first access to the eNB (e.g., random access on the PRACH, or procedure for establishing a radio connection (Radio Resource Control (RRC) Connection)).

In view of the above, one exemplary object of embodiments disclosed in the specification is to provide an MTC UE (M2M terminal), a base station, a method, and a program that are improved to allow the MTC UE to determine necessity of special coverage enhancement processing for MTC UEs (e.g., coverage enhancement processing in the ECM). It should be noted that this object is merely one of objects accomplished by the embodiments disclosed in the specification. The other objects or problems and novel features will be made apparent from the specification or the accompanying drawings.

Solution to Problem

In one aspect, an M2M terminal includes a radio communication unit and a controller. The radio communication unit is configured to communicate with a base station. The controller is configured to receive a first notification from the base station, and to transmit a second notification to the base station when establishing a radio connection with the base station after reception of the first notification or while performing a procedure for establishing a bearer between the M2M terminal and a core network after reception of the first notification. The first notification indicates whether specific coverage enhancement processing is supported in a cell of the base station in which the M2M terminal is located. The second notification indicates that the specific coverage enhancement processing is required or being executed by the M2M terminal.

In one aspect, a base station includes a radio communication unit and a controller. The radio communication unit is configured to communicate with an M2M terminal. The controller is configured to transmit, via the radio communication unit, a first notification indicating that specific coverage enhancement processing for the M2M terminal is supported in a cell of the base station in which the M2M terminal is located.

In one aspect, a method performed by an M2M terminal includes (a) receiving a first notification from a base station, and (b) transmitting a second notification to the base station when establishing a radio connection with the base station after reception of the first notification or while performing a procedure for establishing a bearer between the M2M terminal and a core network after reception of the first notification. The first notification indicates whether specific coverage enhancement processing is supported in a cell of the base station in which the M2M terminal is located. The second notification indicates that the specific coverage enhancement processing is required or being executed by the M2M terminal.

In one aspect, a method performed by a base station includes transmitting a first notification in a cell of the base station in which an M2M terminal is located. The first notification indicates that specific coverage enhancement processing for the M2M terminal is supported in the cell.

In one aspect, a program contains a set of instructions (software codes) which, when loaded into a computer, causes the computer to perform any one of the aforementioned methods.

Advantageous Effects of Invention

According to the above aspects, it is possible to provide an MTC UE (M2M terminal), a base station, a method, and a program that are improved to allow the MTC UE to determine necessity of special coverage enhancement processing for MTC UEs. It should be noted that this effect is merely one of effects expected to be brought about by the embodiments disclosed in the specification.

DESCRIPTION OF EMBODIMENTS

Hereinafter, specific embodiments will be described in detail with reference to the drawings. The same or corresponding components are denoted by the same reference symbols throughout the drawings, and repetitive explanations will be omitted as necessary for the sake of clarity.

Each of embodiments described below may be implemented independently or in combination with any other. These embodiments include novel characteristics different from one another. Accordingly, these embodiments contribute to achieving objects or solving problems different from one another and contribute to obtaining advantages different from one another.

First Embodiment

Figure 1:
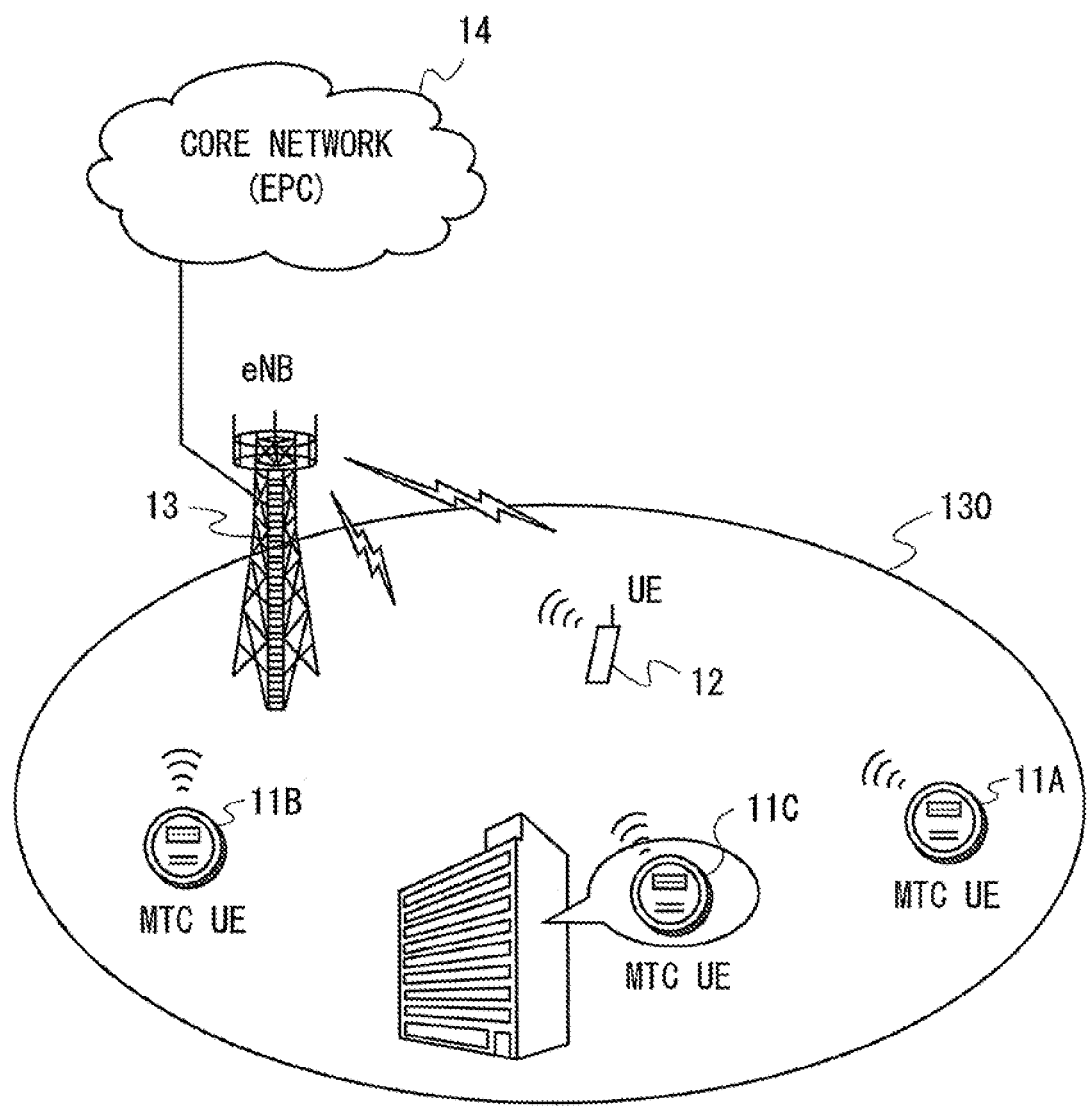
FIG. 1 is a diagram showing a configuration example of a radio communication system according to a first embodiment.

FIG. 1 shows a configuration example of a radio communication system according to this embodiment. This radio communication system provides communication services, such as voice communication or packet data communication or both, for example. With reference to FIG. 1, the radio communication system includes M2M terminals 11 (11A, 11B, 11C), a normal radio terminal 12 which is not an M2M terminal, a base station 13, and a core network 14. The radio terminal 12 is, for example, a mobile telephone, a smartphone, a tablet computer, or a notebook PC. The M2M terminals 11A, 11B, and 11C, and the radio terminal 12 are located in a cell 130 of the base station 13. In this embodiment, the radio communication system is described as being a 3GPP LTE system. That is, the M2M terminals 11 correspond to MTC UEs, the radio terminal 12 corresponds to a normal UE which is not an MTC UE, the base station 13 corresponds to an eNodeB (eNB), and the core network 14 corresponds to an Evolved Packet Core (EPC).

In FIG. 1, the distance between the MTC UE 11A and the eNB 13 is larger than the distance between the MTC UE 11B and the eNB 13. Accordingly, it is assumed that the MTC UE 11A has a large pathloss and its radio quality is degraded. Further, the MTC UE 11C is installed in a building and, accordingly, it is thus assumed that its radio quality is more degraded compared to a case in which the MTC UE 11C is located outdoors. Furthermore, if the capabilities or functions of the MTC UEs 11 (11A, 11B, and 11C) are limited compared to those of the normal UE 12 (e.g., a lower maximum transmission power, a smaller number of reception antennas, no support of high-order modulations), it is expected that degradation in radio quality of the MTC UEs 11 will become more serious. Therefore, the MTC UEs 11 according to this embodiment are configured to support the aforementioned Enhanced Coverage Mode (ECM) and to perform coverage enhancement processing in the ECM.

As already stated above, the coverage enhancement processing in the ECM can be said as processing for enhancing or improving communication characteristics (communication quality) of MTC UEs. As already stated above, the coverage enhancement processing in the ECM may include at least one of the following processing (a) to (d) or may include other processing (e.g., (e) and (f)):

(a) Repeatedly transmitting broadcast information on a PBCH a number of extra times as compared to the normal operation by a predetermined number of times;

(b) Repeatedly transmitting a PPACH (PRACH preamble) a predetermined number of times;

(c) Repeatedly transmitting a PDSCH over multiple subframes;

(d) Repeatedly transmitting a PUSCH over multiple subframes;

(e) Increasing the power spectral density (PSD) of one or both of a PDSCH and a PUSCH (PSD boosting); and (f) Performing frequency hopping during repetitive transmission of one or both of a PDSCH and a PUSCH.

The subframe is a unit constituting a LTE radio frame. One radio frame has a length of ten milliseconds and is composed of ten subframes. Therefore, one subframe has a length of one millisecond. One subframe includes 14 symbols in a time domain (single carrier frequency division multiple access (SC-FDMA) symbols in uplink and orthogonal frequency division multiplexing (OFDM) symbols in downlink).

In the following description, communication control for the ECM according to this embodiment is described. The eNB 13 according to this embodiment transmits, in the cell 130, a first notification indicating that specific coverage enhancement processing for MTC UEs (M2M terminals) (i.e., the coverage enhancement processing in the ECM) is supported in the cell 130 of the eNB 13. The first notification may indicate whether the ECM is supported, on a per-base-station basis (i.e., supported in all the cells of the eNB 13) or on a per-cell basis. The MTC UE 11 receives the first notification from the eNB 13. The MTC UE 11 then transmits a second notification to the eNB 13 after reception of the first notification. The MTC UE 11 may transmit the second notification in response to receiving the first notification from the eNB 13. The MTC UE 11 transmits the second notification to the eNB 13 when establishing a radio connection (RRC Connection) with the eNB 13 or while performing a procedure for establishing a bearer between the MTC UE 11 and the EPC 14 (i.e., Evolved Packet System (EPS) bearer). The second notification indicates that the coverage enhancement processing in the ECM is required by the MTC UE 11 or is being executed by the MTC UE 11.

According to this embodiment, the following effects can be expected. That is, if the MTC UE 11 cannot start the ECM until the eNB 13 has determined the necessity of the ECM for the MTC UE 11 (in particular, the coverage enhancement processing dedicated for the specific MTC UE 11), the MTC UE 11 cannot benefit from the improvement of communication characteristics by the ECM until the determination in the eNB 13 has been completed. This may cause increase in delay time until the MTC UE 11 becomes able to benefit from the enhancement of communication characteristics by the ECM. Accordingly, in the worst case, the MTC UE 11 fails the first access to the eNB 13 (e.g., random access on the PRACH, or procedure for establishing a radio connection (RRC Connection)).

In order to deal with these problems, the eNB 13 according to this embodiment transmits the aforementioned first notification in the cell 130. Accordingly, the MTC UE 11 according to this embodiment can know that the ECM is supported in the cell 130 of the eNB 13 and can transmit the second notification, which indicates the coverage enhancement processing in the ECM is required or being executed by the MTC UE 11, to the eNB 13 when establishing a radio connection (RRC Connection) or while performing an EPS bearer establishment procedure. In most cases, UEs including the MTC UEs 11 measure the radio quality in an idle state before transitioning from an idle state (RRC_IDLE) to a connected state (RRC_CONNECTED) at a periodic or non-periodic communication opportunity. Accordingly, the MTC UE 11 may receive the first notification from the eNB during the idle state and determine the necessity of the ECM based on the radio quality, which is measured during the idle state, prior to arrival of a communication opportunity. It is therefore possible to contribute to a reduction in delay time (delay time until the ECM is started) due to waiting for determination by the eNB 13 of necessity of the ECM after arrival of the communication opportunity.

The terms "idle state" and "connected state" used in the specification is defined as follows. The "idle state" is a state in which a radio connection between a UE and an eNB has been released. Accordingly, the eNB has no information (UE context) regarding the UE in the idle state. The location of the UE in the idle state is tracked by a core network at location-registration-area level (e.g., tracking area or routing area). The core network can reach the UE in the idle state by paging. Further, the UE in the idle state cannot perform unicast data transmission to or from the eNB. Accordingly, the UE in the idle state should transition to the connected state in order to perform unicast data transmission. Examples of the idle state include: (1) an RRC idle state in a Universal Terrestrial Radio Access Network (UTRAN); (2) an RRC_IDLE state in an Evolved UTRAN (E-UTRAN); and (3) an Idle state in WiMAX (IEEE 802.16-2004), mobile WiMAX (IEEE 802.16e-2005), and WiMAX2 (IEEE 802.16m).

On the other hand, the connected state is a state in which the UE is connected to the eNB. Accordingly, the eNB has information (UE context) regarding the UE in the connected state. The location of the UE in the connected state is tracked by the core network at cell level or base-station level. In most cases, the UE in the connected state can perform unicast data transmission to and from the eNB. However, when the UE is in a CELL_PCH state and a URA_PCH state in the UTRAN, the UE context is held by a base station (NodeB), but no dedicated channel is allocated to the UE either in uplink or in downlink. Examples of the connected state include: (1) an RRC connected state in the UTRAN; (2) an RRC_CONNECTED state in the E-UTRAN; and (3) a connected state in the WiMAX, the mobile WiMAX, and the WiMAX2. Note that, the RRC connected state in the UTRAN includes a CELL_DCH state, a CELL_FACH state, a CELL_PCH state, and a URA_PCH state.

Next, specific examples of a method of transmitting the first notification from the eNB 13 to the MTC UE 11 and a method of transmitting the second notification to the eNB 13 from the MTC UE 11 are described.

It is preferable that the first notification is transmitted on a broadcast channel that can be received by the MTC UEs 11 having no radio connection (RRC connection) with the eNB 13, i.e., the MTC UEs 11 in the idle state. In other words, preferably, the first notification is broadcast information that can be received by the MTC UEs 11 in the idle state. Specifically, a Broadcast Control Channel (BCCH), which is one of the logic channels in the LTE, may be used for transmitting the first notification.

More specifically, the first notification is preferably transmitted on a broadcast channel that can be received by each MTC UE 11 that is in the idle state (RCC_IDLE) and further in a detach state (EMM-DEREGISTERED). The detach state (EMM-DEREGISTERED) is one of EPS Mobility Management (EMM) states in the LTE. That is, the detach state (EMM-DEREGISTERED) is a state in which the UE is not registered in a mobility management element (e.g., Mobility Management Entity (MME)) in the core network (e.g., EPC) and the mobility management of the UE is not performed. The location information of the UE in the detach state is not tracked by the MME, and, accordingly, the UE in the detach state is unreachable from the core network (EPC) by paging. The UE in the detach state needs to perform an initial cell selection (i.e., initial cell research), establish a radio connection with the eNB, and perform location registration in the core network (EPC), prior to performing communication. The BCCH can also be received by each MTC UE 11 that is in the idle state (RCC_IDLE) and further in the detach state (EMM-DEREGISTERED).

The BCCH is mapped to a transport channel, i.e., a Broadcast Channel (BCH) or a Downlink Shared Channel (DL-SCH). Further, the BCH, which the BCCH has been mapped to, is transmitted by the eNB 13 using a physical channel, i.e., a Physical Broadcast Channel (PBCH). The PBCH is transmitted using a predetermined resource block of the first subframe in each radio frame and is updated at a period of 40 milliseconds (at a period of four radio frames). The broadcast information transmitted on the PBCH is a Master Information Block (MIB). Therefore, the first notification may be contained in the MIB.

On the other hand, the DL-SCH, which the BCCH has been mapped to, is transmitted by the eNB 13 using a physical channel, i.e., a Physical Downlink Shared Channel (PDSCH). Although the PDSCH is mainly used to transmit user data, transmission of the BCCH (i.e., broadcast information) is specified as one of the special uses of the PDSCH. The resource block used for the BCCH (broadcast information) is indicated by a control message in a Physical Downlink Control Channel (PDCCH). The broadcast information transmitted on the PDSCH is System Information Blocks (SIBs). Therefore, the first notification may be contained in one of the existing SIBs (e.g., System Information Block Type 1 (SIB1)). Alternatively, the first notification may be contained in an SIB that is newly defined for the M2M, MTC UEs, or ECM.

The first notification may indicate whether the ECM is supported in the cell 130 of the eNB 13 either explicitly (e.g., flag bit) or implicitly. The first notification may indicate whether the ECM is supported, on a per-base-station basis (i.e., supported in all the cells of the eNB 13) or on a per-cell basis. The implicit first notification may include configuration information for the coverage enhancement processing in the ECM (ECM radio resource configuration or ECM configuration).

The ECM radio resource configuration or ECM configuration may include, for example, at least one of the following information items:

Configuration information regarding reception of broadcast information (PBCH);

Configuration information regarding reception of system information (System Information Block (SIB));

Configuration information regarding reception of paging (Paging Channel (PCH));

Configuration information regarding reception of downlink control information (Physical Downlink Control Channel (PDCCH));

Configuration information regarding reception of downlink data (PDSCH);

Configuration information regarding transmission of uplink control information (Physical Uplink Control Channel (PUCCH));

Configuration information regarding transmission of uplink data (PUSCH); and

Configuration information regarding measurement reporting of radio quality (Measurement Report).

The configuration information regarding reception of the broadcast information (PBCH) and the configuration information regarding reception of the system information (SIB) may be, for example, information indicating which subframe(s) and/or which OFDM symbol(s) is used to repeatedly transmit the broadcast information and (which kind of) system information. The configuration information regarding reception of paging may be, for example, information indicating which subframe(s) is used to repeatedly transmit paging. The configuration information regarding reception of the downlink control information (PDCCH) and reception of the downlink data (PDSCH) may be, for example, information indicating how many times they are repeatedly transmitted or may be information indicating which subframe(s) is used for repeatedly transmitting them. The configuration information regarding transmission of the uplink control information (PUCCH) and the transmission of the uplink data (PUSCH) may be, for example, information indicating how many times they are repeatedly transmitted or may be information indicating which subframe(s) is used for repeatedly transmitting them. The configuration information regarding measurement reporting of radio quality may be an offset value or a threshold applied to the measurement result of the radio quality while the ECM is being executed or may be an offset value or a threshold applied to determination on the report of the measurement result of the radio quality while the ECM is being executed.

Next, the second notification is described in detail. The second notification may be transmitted using, for example, a message for requesting establishment of a radio connection (RRC connection), i.e., an RRC Connection Request message. Since an RRC Connection Request message is transmitted first in the RRC connection establishment procedure, it can also be said that the second notification is transmitted during a procedure for establishing a radio connection (RRC connection). From another point of view, the RRC Connection Request message is transmitted in a third step of a random access procedure (Random Access Channel (RACH) procedure). Accordingly, if the RRC Connection Request message is used, it can also be said that the second notification is transmitted during a random access procedure (RACH procedure).

In another example, the second notification may be transmitted using a completion message indicating completion of establishment of the radio connection (RRC connection), i.e., an RRC Connection Setup Complete message. Since the RRC Connection Setup Complete message is the final message transmitted during an RRC connection establishment procedure, it can be said that the second notification is transmitted during a procedure for establishing a radio connection (RRC connection). Further, the RRC Connection Setup Complete message contains a NAS message (e.g., NAS: Service Request, NAS: Attach Request). The RRC Connection Setup Complete message containing a NAS message is the first message transmitted during a procedure for establishing an EPS bearer. Therefore, if the RRC Connection Setup Complete message is used, it can be said that the second notification is transmitted during a bearer establishment procedure.

By using the RRC Connection Request message or the RRC Connection Setup Complete message for transmitting the second notification, the MTC UE 11 can promptly inform the eNB 13 that the MTC UE 11 requires the ECM or is executing the ECM, during a procedure for establishing a radio connection. Thus, for example, the eNB 13 can include the ECM configuration in the configuration of the radio connection to be established for the MTC UE 11 and can promptly start communication with the MTC UE 11 using the coverage enhancement processing in the ECM. It is needless to say that, from the viewpoint of establishment of the radio connection (RRC connection), the second notification may be transmitted using an RRC Connection Reestablishment Complete message, which is similar to the RRC Connection Setup Complete message.

In another example, the second notification may be transmitted during a random access procedure (RACH procedure) performed prior to establishment of the radio connection (RRC connection). Specifically, PRACH preamble transmission in the first step of the random access procedure (RACH procedure) may be used for transmitting the second notification. In this case, the second notification may implicitly indicate that the ECM is required or being executed by the MTC UE 11 by the MTC UE 11 using a specific radio resource (e.g., time, frequency, code, or preamble sequence) allocated for the ECM among a plurality of radio resources for the PRACH.

Since only a PRACH preamble can be transmitted on the PRACH, it may be difficult to indicate the details of the ECM required or being executed by the MTC UE 11 (e.g., which one or more of coverage enhancement processes are specifically required). Therefore, the aforementioned RRC Connection Request message or RRC Connection Setup Complete message may be more suitable for transmission of the second notification. However, by using the PRACH preamble for transmitting the second notification, it is possible to notify the eNB 13 of the information, which indicates whether the ECM is required or being executed by the MTC UE 11, much faster compared to using the RRC Connection Request message or RRC Connection Setup Complete message.

In the following description, specific examples of processing for determining whether the ECM is required by the MTC UE 11 are described. In response to detecting that the ECM is supported in the cell 130 of the eNB 13 based on the first notification from the eNB 13, the MTC UE 11 may determine whether the ECM (that is, the coverage enhancement processing in the ECM) is required in the MTC UE 11.

When the MTC UE 11 determines that the ECM is required, the MTC UE 11 may start one or more executable processes selected from a plurality of coverage enhancement processes in the ECM. The MTC UE 11 may start, for example, reception of a PBCH that is repeatedly transmitted, or repeated transmission of a PRACH preamble in a random access procedure, or both of them. Accordingly, the second notification may indicate that the ECM is being executed by the MTC UE 11.

On the other hand, for example, PDSCH/PUSCH repetition requires allocation of radio resources by the eNB 13.

Therefore, the MTC UE 11 may notify the eNB 13 of necessity of the coverage enhancement processing that the eNB 13 is required to deal with (e.g., PDSCH/PUSCH repetition). Further, the MTC UE 11 may notify the eNB 13 of necessity of all the coverage enhancement processes in the ECM including processing that can be independently executed in the MTC UE 11 (e.g., reception of a repeated PBCH, repeated transmission of a PRACH preamble). Accordingly, the second notification may indicate that the ECM is required by the MTC UE 11.

The MTC UE 11 may determine necessity of the ECM (the coverage enhancement processing in the ECM) by considering at least one of access cause, terminal capability (UE capability), terminal information (UE information), communication characteristics (communication performance), and radio quality of the MTC UE 11.

Specific examples of the access cause, terminal capability, terminal information, communication characteristics, and radio quality are described below. However, the contents of the access cause, terminal capability, terminal information, communication characteristics, and radio quality are not limited to them.

The access cause may include at least one of the following two items:
Purpose of establishing an RRC connection (Establishment cause); and
Service type.

The purpose of establishing an RRC connection may specify, for example, (a) an emergency call (emergency), (b) a high priority access (highPriorityAccess), (c) an access for mobile terminated communication (mt-Access), mobile originated signaling (mo-Signalling), (d) terminal originated data transmission (mo-Data), (e) a delay tolerant access (delayTolerantAccess), (f) a low priority access (lowPriorityAccess), (g) an access for small data communication (smallDataAccess), (h) an access for small packet communication (smallPacketAccess), (i) a limited access (limitedAccess), (j) an access for a limited service (limitedService), (k) an M2M-type access (m2mAccess), or (l) an access using the ECM (ecmAccess).

The service type may specify, for example, (a) a real-time service, (b) a non real-time service, or (c) M2M-type communication.

The terminal capability may include, for example, at least one of the following three items:
Radio access capability;
Device capability; and
Terminal category (UE category).

The radio access capability may include, for example, (a) information indicating whether the UE is supporting the terminal function defined in the 3GPP LTE (e.g., flag bit) or (b) information indicating whether the UE is supporting the ECM. In order to indicate whether the UE is supporting the ECM, an information element (IE) named "EcmSupport" may be defined. For example, the true value of "EcmSupport" indicates that the ECM is supported (Supported) and the false value thereof indicates that the ECM is not supported (NotSupported). Further, an IE named "EnhancedCoverageMode" may be defined. For example, when EcmSupport is set to a value "Supported", it indicates that the UE is supporting the ECM. On the other hand, if the UE does not support the ECM, EcmSupport may be set to a value "NotSupported". Alternatively, no sending of this IE may imply that the UE is not supporting the ECM.

The device capability may include, for example, (a) information indicating that the UE is an MTC UE, (b) information indicating that communication capability of the UE is limited (compared to that of a normal UE), or (c) information indicating that the UE performs only a specific communication (e.g., M2M-type communication).

The terminal category may include, for example, (a) information indicating one of terminal categories defined in the 3GPP LTE or (b) information indicating one of access classes defined in the 3GPP LTE. New terminal category or new access class may be defined for MTC UEs performing M2M-type communication. For example, a new category (e.g., category 0) for MTC UEs whose functions are limited in order to implement it at a low cost may be defined. Further or alternatively, a new access class (AC) that indicates infrequent communication or allows only infrequent communication may be defined.

The terminal information may include at least one of the following three items:
Terminal type (UE type);
Device type; and
Terminal context (UE context).

The terminal type may include, for example, (a) information indicating whether the UE is a normal UE (non-MTC UE) or an MTC UE, (b) information indicating whether the UE has mobility (or information indicating that the UE has no mobility), or (c) information indicating whether there is a power supply for the UE.

The device type may include, for example, (a) information indicating the type of the operating system (OS) installed in the UE or (b) information indicating the type of the M2M-type communication performed by the UE (i.e., sub-category information of the M2M).

The terminal context may include, for example, (a) information on the aforementioned terminal capability, (b) RRC control information configured in the UE (e.g., information contained in a RadioResrouceConfigCommon IE and a RadioResourceConfigDedicated IE), (c) information regarding the mobility of the UE (mobility information), (d) information indicating whether the UE is executing the ECM (ECM execution information), or (e) information indicating whether the UE has executed the ECM before (e.g., when the UE was in the RRC_CONNECTED state last time) (ECM status information).

The communication characteristic may include, for example, at least one of the following two items:
Performance measurement result (e.g., L2 measurement); and
Statistical communication quality (e.g., KPI).

The performance measurement result may include, for example, (a) measurement results of a block error rate (Block Error Rate), (b) measurement results of a packet error rate (Packet Error Rate), (c) measurement results of throughput (e.g., Scheduled IP Throughput), (d) a measurement results of packet loss (Packet Loss Rate), or (e) measurement results of packet discard (Packet Discard Rate).

The statistical communication quality may include, for example, (a) the number of handover attempts or a handover attempt rate, (b) a handover success rate or a handover failure rate, (c) a communication interval or a communication frequency, (d) a packet occurrence interval or a packet occurrence frequency, (e) a packet arrival interval (packet inter-arrival time) or a packet arrival frequency (packet inter-arrival rate), (f) an access interval or an access frequency, or (g) an interval or a frequency of an RRC connection establishment or a NAS connection establishment.

The radio quality may include, for example, at least one of the following two items:

Received quality of a reference signal (Reference Signal (RS) received quality); and Channel quality indicator (CQI).

The received quality of a reference signal (RS) may include, for example, received power (RSRP), (b) reception quality (RSRQ), or received power intensity (RSSI) of a downlink RS at the UE.

Determination by the MTC UE 11 of necessity of the ECM can be performed at appropriate times. For example, the MTC UE 11 may determine necessity of the ECM when the MTC UE 11 is powered on, when the MTC UE 11 is performing initial cell selection (i.e., initial cell research) in the idle state (RRC_IDLE), or when the MTC UE 11 is performing cell reselection in the idle state (RRC_IDLE). By determining necessity of the ECM in advance while the MTC UE 11 is in the idle state, it is possible to contribute to reduction in delay time (delay time until the ECM is started) due to waiting for determination by the eNB 13 of necessity of the ECM after arrival of the communication opportunity.

Alternatively, the MTC UE 11 may determine necessity of the ECM prior to an access to the eNB 13 to establish a radio connection, at a periodic or non-periodic communication opportunity (e.g., periodic communication permitted period, occurrence of non-periodic uplink transmission data, or reception of paging). Alternatively, the MTC UE 11 may determine necessity of the ECM while the MTC UE 11 is accessing the eNB 13 to establish a radio connection (e.g., during a RACH access procedure or an RRC Connection establishment procedure). In one more alternative, the MTC UE 11 may determine necessity of the ECM after establishment of a radio connection (RRC connection).

Further, different operations regarding the ECM (i.e., control of reception or transmission of the MTC UE 11 or eNB 13) may be defined for multiple ECM levels. In this case, the MTC UE 11 may determine not only whether the ECM is required (or whether to execute the ECM) but also which operation level is necessary (or which operation level should be executed) and send to the eNB 13 the second notification indicating the determined level. The eNB 13 may allow for the ECM operation level reported from the MTC UE 11 based on the second notification sent from the MTC UE 11. Alternatively, the eNB 13 may determine a level different from that reported from the MTC UE 11 and send a notification indicating the determined level to the MTC UE 11. That is, the eNB 13 may have the authority to make a final decision on the ECM operation level that the MTC UE 11 should follow.

Further, when the MTC UE 11 determines to execute the ECM or the eNB 13 determines to apply the ECM to the MTC UE 11, the MTC UE 11 may continue executing the ECM even after transitioning to RRC_IDLE from RRC_CONNECTED. Further, when the MTC UE 11 determines to execute the ECM or the eNB 13 determines to apply the ECM to the MTC UE 11, the MTC UE 11 may continue executing the ECM during a delay tolerant access.

Further, after initial determination of whether the ECM is required (or whether to execute the ECM), the MTC UE 11 may determine whether to continue executing the ECM based on communication characteristics or radio quality of the MTC UE 11. For example, the MTC UE 11 may acquire one or both of a block error rate and a packet error rate as the communication characteristics of the MTC UE 11 and may suspend (or stop) the ECM when it determines that one or both of the block error rate and the packet error rate below a predetermined threshold. Further or alternatively, the MTC UE 11 may acquire one or both of RSRP and RSRQ as the radio quality and may suspend (or stop) the ECM when it determines that one or both of the RSRP and the RSRQ exceed a predetermined threshold.

Figure 2:
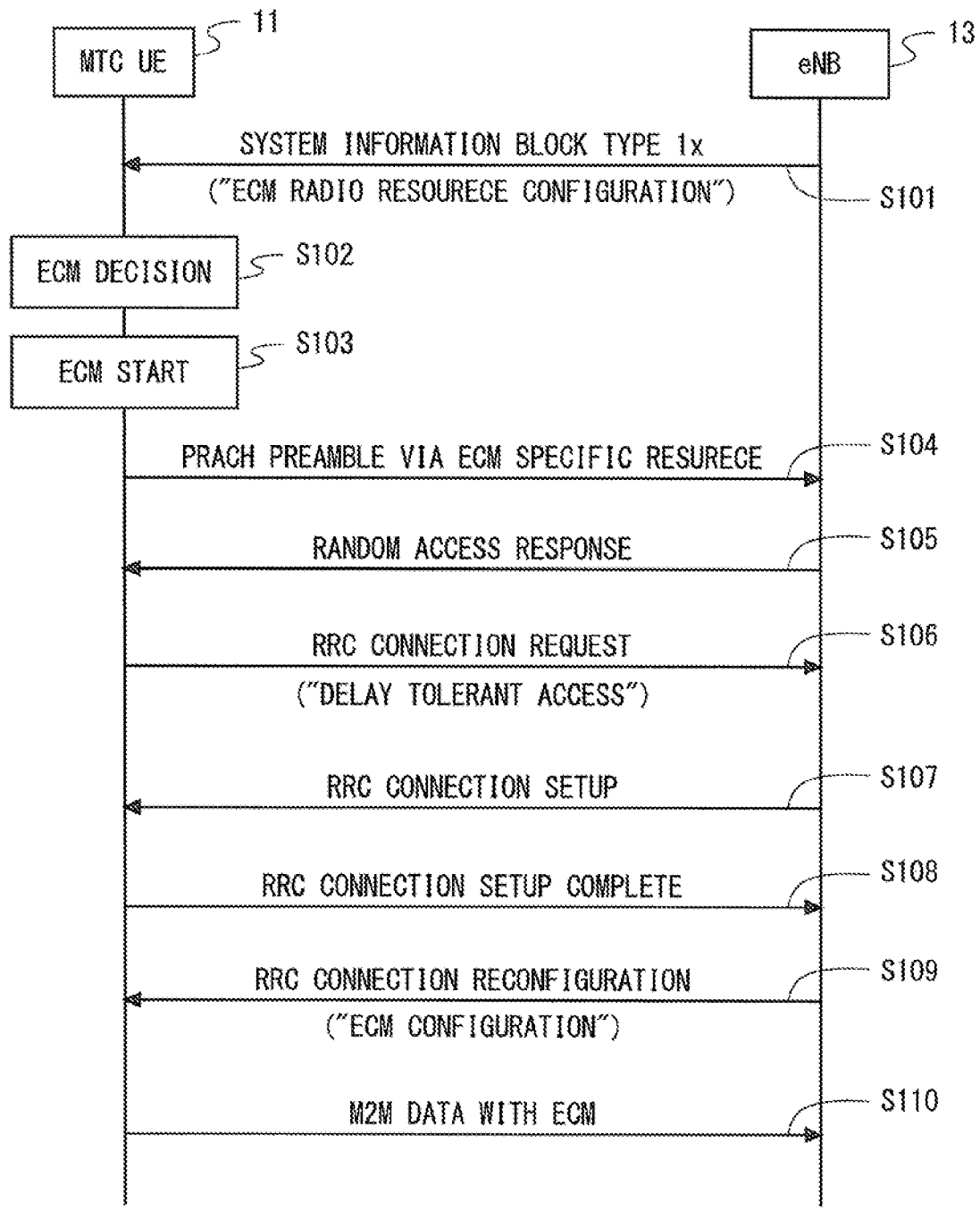
FIG. 2 is a sequence diagram showing one example of communication procedures according to the first embodiment.

FIG. 2 is a sequence diagram showing one example of operations of the MTC UE 11 and the eNB 13 according to this embodiment. FIG. 2 shows only the messages that are necessary for explanation of this embodiment and some messages included in the procedure specified in the LTE standard are not shown.

In Step S101 of FIG. 2, the eNB 13 broadcasts, in the cell 130, the first notification indicating that the eNB 13 is supporting the ECM (System Information Block Type 1x). The first notification may be contained in any one of SIBs, as shown in FIG. 2. As already stated above, the first notification may indicate whether the eNB 13 (or the cell 130 of the eNB 13) is supporting the ECM either explicitly (e.g., flag bit) or implicitly. The implicit first notification may include configuration information of radio resources used in the ECM (ECM radio resource configuration).

In Step S102, the MTC UE 11 determines whether the ECM is required (or whether to execute the ECM) (ECM decision). As already stated above, the MTC UE 11 may perform the determination in Step S102 at a periodic or non-periodic communication opportunity (e.g., periodic communication permitted period, occurrence of non-periodic uplink transmission data, or reception of paging). Alternatively, the MTC UE 11 may perform the determination in Step S102 when the MTC UE 11 is powered on, when the MTC UE 11 is performing initial cell selection (i.e., initial cell research) in the idle state (RRC_IDLE), or when the MTC UE 11 is performing cell reselection in the idle state (RRC_IDLE).

As already stated above, the determination in Step S102 may be performed based on various parameters. For example, this determination may be performed based on whether the ECM is supported in the cell 130 in which the MTC UE 11 is located (or whether the ECM is supported by the eNB 13 that manages the cell). This determination may be performed based on whether the terminal capability (or the device capability) of the MTC UE 11 supports the ECM. This determination may be performed based on whether access cause to the eNB 13 is a delay tolerant access. This determination may be performed based on whether radio quality of the MTC UE 11 is lower than a predetermined threshold.

FIG. 2 shows a case in which the MTC UE 11 requires the ECM. Therefore, in Step S103, the MTC UE 11 starts executing the ECM (ECM start). In Steps S104 to S108, the MTC UE 11 accesses the eNB 13 while performing the ECM operations (coverage enhancement processing).

Specifically, in Step S104, the MTC UE 11 transmits a random access preamble (PRACH Preamble). In the example shown in FIG. 2, ECM-specific radio resources (e.g., time, frequency, code, preamble sequence) are allocated or available for transmitting the PRACH preamble. Accordingly, the MTC UE 11 transmits a PRACH preamble using any one of the ECM-specific radio resources.

In Step S105, the eNB 13 transmits a random access response in response to detection of the PRACH preamble (Random Access Response). When the PRACH preamble is received on any one of the ECM-specific radio resources, the eNB 13 recognizes that the UE that has transmitted the preamble is executing the ECM. Accordingly, the radio resources used to transmit the random access response or the transmission mode of the random access response (e.g., repeated transmission of a PDCCH or PDSCH) may be an ECM-specific one. However, the eNB 13 cannot identify the UE that has transmitted the preamble at the time of detection of the PRACH preamble. This is because the PRACH preamble does not include any identifier of the UE that has transmitted the preamble.

In Step S106, the MTC UE 11 transmits a message for requesting establishment of a radio connection (RRC connection) in response to receiving the random access response (RRC Connection Request). In Step S106, the MTC UE 11 may inform the eNB 13 that the access is a delay tolerant access. Further, the MTC UE 11 may use any one of ECM-specific radio resources or any one of ECM-specific transmission modes (e.g., repeated transmission of a PUSCH) to transmit the RRC Connection Request message.

In Step S107, the eNB 13 transmits configuration information necessary to establish the radio connection (RRC connection) in response to receiving the RRC Connection Request from the MTC UE 11 (RRC Connection Setup). In Step S108, the MTC UE 11 transmits a completion message indicating completion of the establishment of the radio connection (RRC connection) (RRC Connection Setup Complete). In Steps S107 and S108, any one of ECM-specific radio resources or any one of ECM-specific transmission modes may be used.

In Step S109, the eNB 13 transmits radio resource configuration information (Radio Resource Configuration) to the MTC UE 11. The transmission in Step S108 is performed in a procedure for establishing an EPS bearer based on a NAS message (e.g., NAS: Service Request, NAS: Attach Request) from the MTC UE 11 (not shown). The radio resource configuration information in Step S108 may contain ECM configuration information (ECM configuration) necessary to execute the ECM. The ECM configuration information (ECM configuration) includes, for example, configuration information regarding coverage enhancement processing (e.g., PDSCH/PUSCH repetition) applied to transmission of user data or control data (e.g., Hybrid Automatic Repeat Request (HARQ) ACK/NACK, and Channel State Information (CSI)) after establishment of the EPS bearer.

In Step S110, the MTC UE 11 performs data communication using the coverage enhancement processing in the ECM in accordance with the radio resource configuration information and the ECM configuration information (M2M data with ECM).

Figure 3:
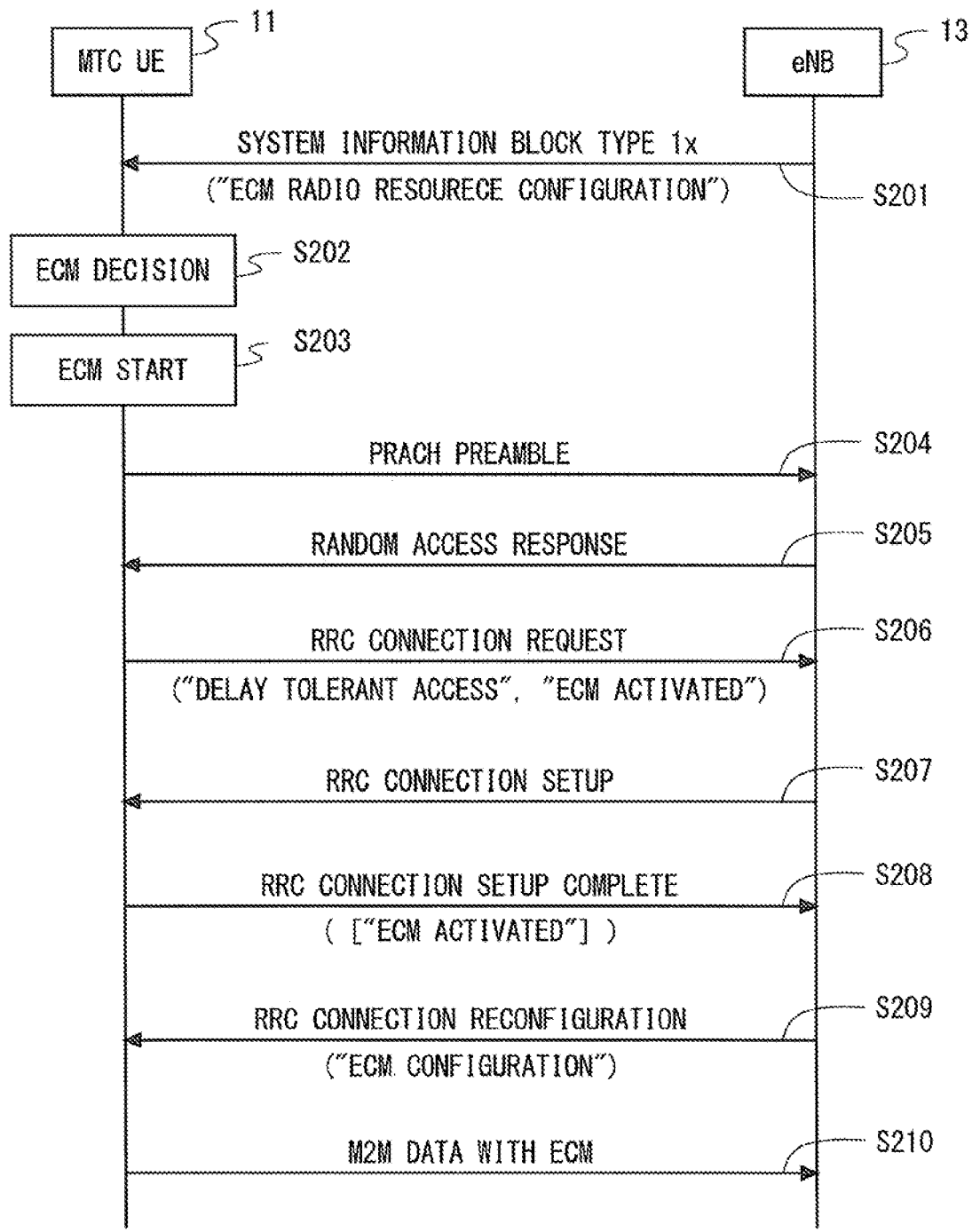
FIG. 3 is a sequence diagram showing another example of the communication procedures according to the first embodiment.

FIG. 3 is a sequence diagram showing another example of the operations of the MTC UE 11 and the eNB 13 according to this embodiment. FIG. 3 shows only the messages that are necessary for explanation of this embodiment and some messages included in the procedure specified in the LTE standard are not shown.

The processes in Steps S201 to S203 in FIG. 3 are similar to those in Steps S101 to S103 in FIG. 2. In Step S204, the MTC UE 11 transmits a random access preamble (PRACH Preamble). In the example shown in FIG. 3, the MTC UE 11 cannot use the ECM-specific radio resources to transmit the PRACH preamble. Accordingly, the MTC UE 11 transmits the PRACH preamble using any one of resources commonly used by the normal UE 12. In Step S205, the eNB 13 transmits a random access response in response to detection of the PRACH preamble (Random Access Response).

In Step S206, the MTC UE 11 transmits a message for requesting establishing a radio connection (RRC connection) in response to receiving the random access response (RRC Connection Request). In Step S206, the MTC UE 11 may inform the eNB 13 that the access is a delay tolerant access. Further, the MTC UE 11 may transmit the second notification (ECM activated) indicating that the ECM is being executed using the RRC Connection Request message in Step S206. In order to transmit the second notification, an information element (IE) named, for example, "ECM status" (or ECM process, ECM flag) may be defined. For example, when the ECM status is set to a true value or a value "Activated" it indicates that the MTC UE 11 is executing the ECM. On the other hand, when the ECM status is set to a false value or a value "Not-activated", it may indicate that the ECM is not being executed. Further, the second notification may be one-bit flag, which indicates that the ECM is being executed when the value of the flag is 1 and indicates that the ECM is not being executed when the value of the flag is 0.

During Steps S201 to S206, the MTC UE 11 may receive predetermined downlink messages (e.g., paging, broadcast information (PBCH or SIB)) using any one of the ECM-specific processing.

In Step S207, the eNB 13 transmits configuration information necessary to establish the radio connection (RRC connection) in response to receiving the RRC Connection Request from the MTC UE 11 (RRC Connection Setup). In Step S208, the MTC UE 11 transmits a completion message indicating completion of the establishment of the radio connection (RRC connection) (RRC Connection Setup Complete). The second notification (ECM activated) may be transmitted using the RRC Connection Setup Complete message in Step S208 in place of the RRC Connection Request message in Step S206.

The processes in Steps S209 and S210 are similar to those in Steps S109 and S110 in FIG. 2.

Second Embodiment

A configuration example of a radio communication system according to this embodiment may be the same as that of FIG. 1 described in the first embodiment. In this embodiment, a modified example of the specific sequences described in the first embodiment is described. In the specific examples shown in FIGS. 2 and 3, the MTC UE 11 determines the execution of the ECM and the eNB 13 complies with the determination by the MTC UE 11. However, in some cases, the determination by the MTC UE 11 may be incorrect. An eNB 23 according to this embodiment does not completely comply with the determination by an MTC UE 21 and additionally determines whether the ECM requested by the MTC UE 21 is truly necessary.

Figure 4:
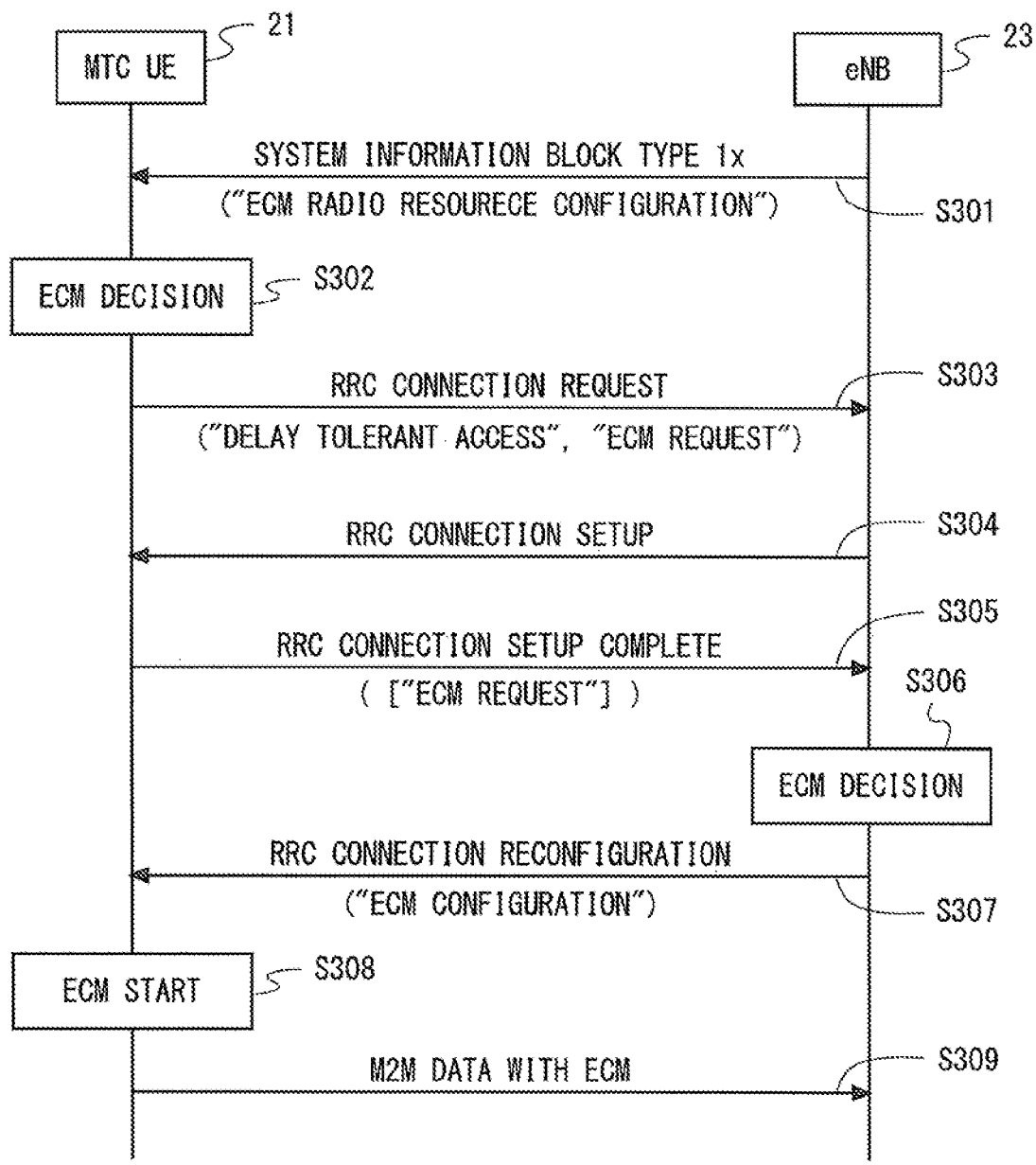
FIG. 4 is a sequence diagram showing one example of communication procedures according to a second embodiment.

FIG. 4 is a sequence diagram showing one example of operations of the MTC UE 21 and the eNB 23 according to this embodiment. FIG. 4 shows only the messages that are necessary for explanation of this embodiment and some messages included in the procedure specified in the LTE standard are not shown.

The process in Step S301 of FIG. 4 is similar to that in Step S101 in FIG. 2. In Step S302, the MTC UE 21 determines whether the ECM is required (ECM decision). FIG. 4 shows a case in which the MTC UE 21 requires the ECM. Accordingly, in Step S303, the MTC UE 21 transmits a message for requesting establishment of a radio connection (RRC connection) (RRC Connection Request). In FIG. 4, the first and second steps of the random access procedure (i.e., transmission of a PRACH preamble and reply of a Random Access Response) are not shown.

In Step S303, the MTC UE 21 may inform the eNB 23 that the access is a delay tolerant access. Further, the MTC UE 21 may transmit the second notification (ECM Request)

indicating that the MTC UE 21 requires the ECM using the RRC Connection Request message in Step S303. This second notification (ECM Request) requests the eNB 23 to execute the ECM for the MTC UE 21 (the coverage enhancement processing in the ECM).

In Step S304, the eNB 23 transmits configuration information necessary to establish a radio connection (RRC connection) in response to receiving the RRC Connection Request from the MTC UE 21 (RRC Connection Setup). In Step S305, the MTC UE 21 transmits a completion message indicating completion of the establishment of the radio connection (RRC connection) (RRC Connection Setup Complete). The second notification (ECM Request) may be transmitted using the RRC Connection Setup Complete message in Step S305 in place of the RRC Connection Request message in Step S303.

In Step S306, the eNB 23 determines whether the ECM is necessary for the MTC UE 21 (or whether to execute the ECM for the MTC UE 21) (ECM decision). In the determination in Step S306, the eNB 23 may use parameters similar to those used in the determination of necessity of the ECM by the MTC UE 11 described in the first embodiment.

FIG. 4 shows a case in which the eNB 23 determines that the ECM is necessary (or the ECM should be executed) for the MTC UE 21. Accordingly, in Step S307, the eNB 23 transmits radio resource configuration information (Radio Resource Configuration) to the MTC UE 21 (RRC Connection Reconfiguration). The transmission in Step S307 may be performed in a procedure for establishing an EPS bearer based on a NAS message (e.g., NAS: Service Request, NAS: Attach Request) from the MTC UE 21 (not shown). The radio resource configuration information in Step S307 may contain ECM configuration information (ECM configuration) necessary to execute the ECM. Further, the radio resource configuration information in Step S307 may contain information for explicitly instructing the MTC UE 21 to execute the ECM.

In Step S308, the MTC UE 21 starts executing the ECM in response to the explicit or implicit instruction from the eNB 23 in Step S307 (ECM start). In Step S309, the MTC UE 21 performs data communication using the coverage enhancement processing in the ECM in accordance with the radio resource configuration information and the ECM configuration information (M2M data with ECM).

Third Embodiment

A configuration example of a radio communication system according to this embodiment may be the same as that of FIG. 1 described in the first embodiment. In this embodiment, a modified example of the specific sequences described in the first and second embodiments (FIGS. 2, 3, and 4) is described.

It can be said that the procedure described in this embodiment is a combination of the procedures shown in FIG. 2 (or FIG. 3) and FIG. 4. That is, in this embodiment, an MTC UE 31 itself determines necessity of the ECM, starts executing the ECM based on this determination, and informs an eNB 33 that the MTC UE 31 requires the ECM (or is executing the ECM) (second notification). The eNB 33 determines whether the ECM is necessary for the MTC UE 31 in response to receiving the second notification from the MTC UE 31. When the eNB 33 determines that the ECM is necessary, the eNB 33 transmits ECM configuration information to the MTC UE 31 and when the eNB 33 determines that the ECM is not necessary, the eNB 33 sends an instruction to suspend (or stop) the ECM to the MTC UE 31.

According to this procedure for controlling the ECM, the MTC UE 31 can promptly start the ECM based on the determination by the MTC UE 31 itself. Further, the eNB 33 can check the validity of the determination by the MTC UE 31 of necessity of the ECM and can reject an inappropriate determination, i.e., the eNB 33 can stop the ECM.

Figure 5:
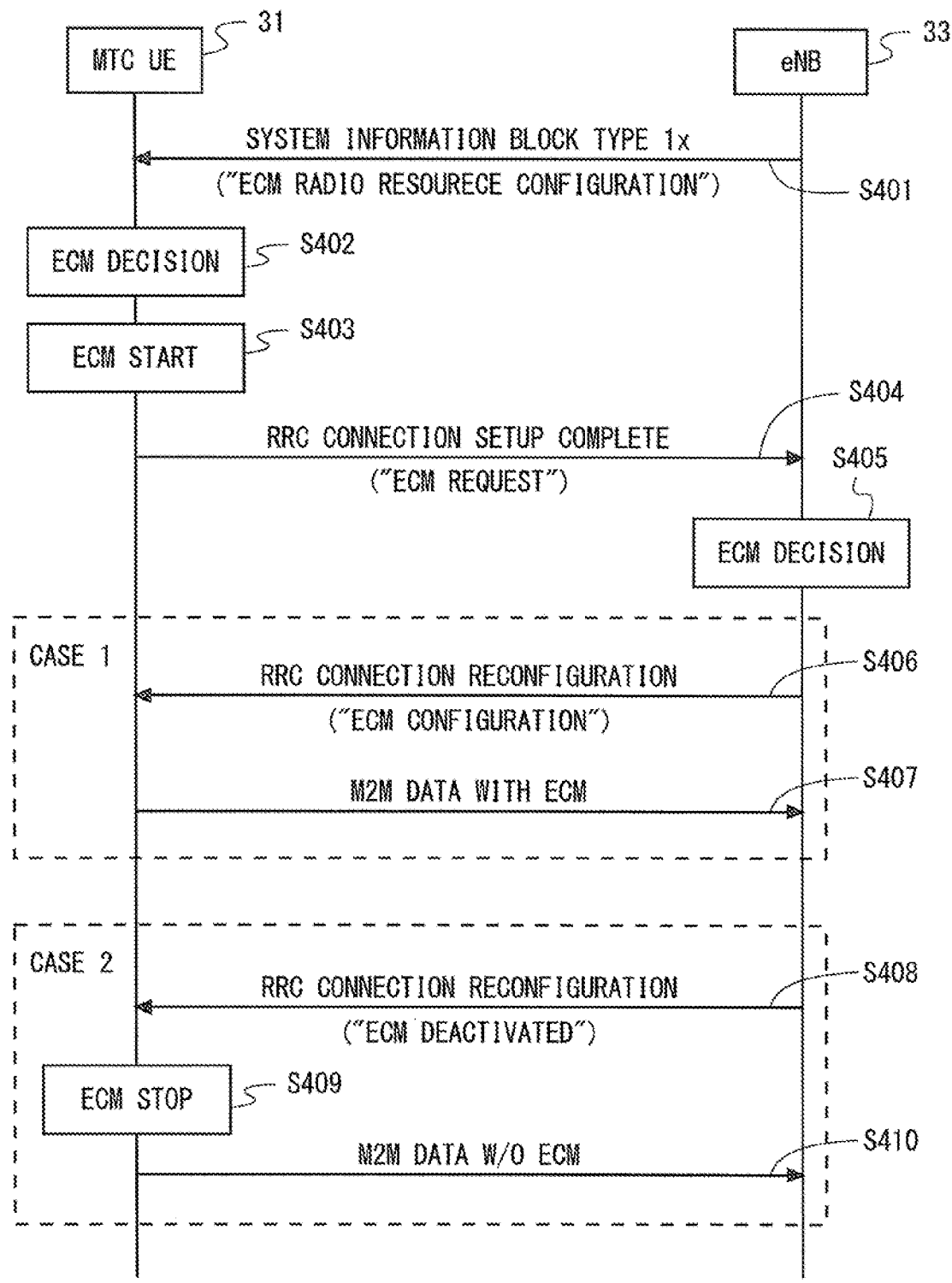
FIG. 5 is a sequence diagram showing one example of communication procedures according to a third embodiment.

FIG. 5 is a sequence diagram showing one example of operations of the MTC UE 31 and the eNB 33 according to this embodiment. FIG. 5 shows only the messages that are necessary for explanation of this embodiment and some messages included in the procedure specified in the LTE standard are not shown.

The processes in Steps S401 to S403 in FIG. 5 are similar to those in Steps S101 to S103 shown in FIG. 2. In Step S404, the MTC UE 31 transmits a completion message indicating completion of establishment of a radio connection (RRC connection) (RRC Connection Setup Complete). In FIG. 5, the first to fourth steps of the random access procedure (i.e., steps from PRACH preamble transmission by the MTC UE 31 to RRC Connection Setup message transmission by the eNB 33) are not shown.

The MTC UE 31 may transmit the second notification (ECM Request) indicating that the MTC UE 31 requires the ECM using the RRC Connection Setup Complete message in Step S404. This second notification (ECM Request) requests the eNB 33 to execute the ECM (the coverage enhancement processing in the ECM) for the MTC UE 31. The second notification (ECM Request) may be transmitted using an RRC Connection Request message (not shown) in place of the RRC Connection Setup Complete message in Step S404.

In Step S405, the eNB 33 determines whether the ECM is necessary for the MTC UE 31 (or whether to execute the ECM for the MTC UE 31) (ECM decision). In the determination in Step S405, the eNB 33 may use parameters similar to those used in the determination of necessity of the ECM by the MTC UE 11 described in the first embodiment.

Steps S406 and S407 show a case in which the eNB 33 determines that the ECM is necessary (or the ECM is executed) for the MTC UE 31 (case 1 shown in FIG. 5). In Step S406, the eNB 33 transmits radio resource configuration information (Radio Resource Configuration) to the MTC UE 31 (RRC Connection Reconfiguration). The radio resource configuration information in Step S406 may contain ECM configuration information (ECM configuration) necessary to execute the ECM. Further, the radio resource configuration information in Step S406 may contain information for explicitly instructing the MTC UE 31 to execute the ECM. In Step S407, the MTC UE 31 performs data communication using the coverage enhancement processing in the ECM in accordance with the radio resource configuration information and the ECM configuration information (M2M data with ECM).

On the other hand, Steps S408 to S410 show a case the eNB 33 determines that the ECM is not necessary for the MTC UE 31 (or the ECM should be suspended or stopped) (case 2 shown in FIG. 5). In Step S408, the eNB 33 transmits resource configuration information (Radio Resource Configuration) to the MTC UE 31 (RRC Connection Reconfiguration). The radio resource configuration information in Step S408 contains an instruction to suspend (or stop) execution of the ECM (ECM deactivated). In Step S409, the MTC UE 31 suspends (or stops) execution of the ECM (ECM stop). In Step S410, the MTC UE 31 performs data communication without using the coverage enhancement processing in the ECM (M2M data without ECM).

Fourth Embodiment

A configuration example of a radio communication system according to this embodiment may be to the same as that of FIG. 1 described in the first embodiment. In this embodiment, a modified example of the specific sequences described in the third embodiment (FIG. 5) is described.

In this embodiment, similar to the MTC UE 31 according to the third embodiment, an MTC UE 41 itself determines necessity of the ECM, starts executing the ECM based on this determination, and informs the eNB 43 that the MTC UE 41 requires the ECM (or is executing the ECM) (second notification). After that, the MTC UE 41 suspends (or stops) execution of the ECM to wait for a determination by the eNB 43. With regard to this point, this embodiment is different from the third embodiment. For example, the MTC UE 41 may starts the coverage enhancement processing in the ECM (e.g., reception of a repeated PBCH, repeated transmission of a PRACH preamble, and repetition of a PDSCH/PUSCH) when accessing to the eNB 43 and continue the processing until the radio connection (RRC connection) has been established, and then suspend the execution of the ECM. In other words, the MTC UE 41 may execute the ECM during at least the random access procedure (RACH procedure) and the RRC connection establishment procedure and then suspend execution of the ECM.

Similar to the eNB 33 according to the third embodiment, the eNB 43 according to this embodiment determines whether the ECM is necessary for the MTC UE 41 in response to receiving the second notification from the MTC UE 41. Upon determining that the ECM is necessary, the eNB 43 transmits ECM configuration information to the MTC UE 41 and upon determining that the ECM is not necessary, transmits an instruction to suspend (or stop) the ECM to the MTC UE 41. The MTC UE 41 re-starts the ECM that has been suspended (stopped) in response to receiving the ECM configuration information from the eNB 43.

According to the procedure for controlling the ECM as stated above, similar to the third embodiment, the MTC UE 41 can promptly start the ECM based on the determination by the MTC UE 41 itself. In particular, by temporarily executing the ECM until at least the radio connection (RRC connection) has been established, it is possible to avoid failure of the first access by the MTC UE 41 to the eNB 43 (e.g., random access using a PRACH or RRC Connection establishment). On the other hand, the eNB 43 can check the validity of the determination by the MTC UE 31 of necessity of the ECM and selectively start the ECM only when it is appropriate.

Figure 6:
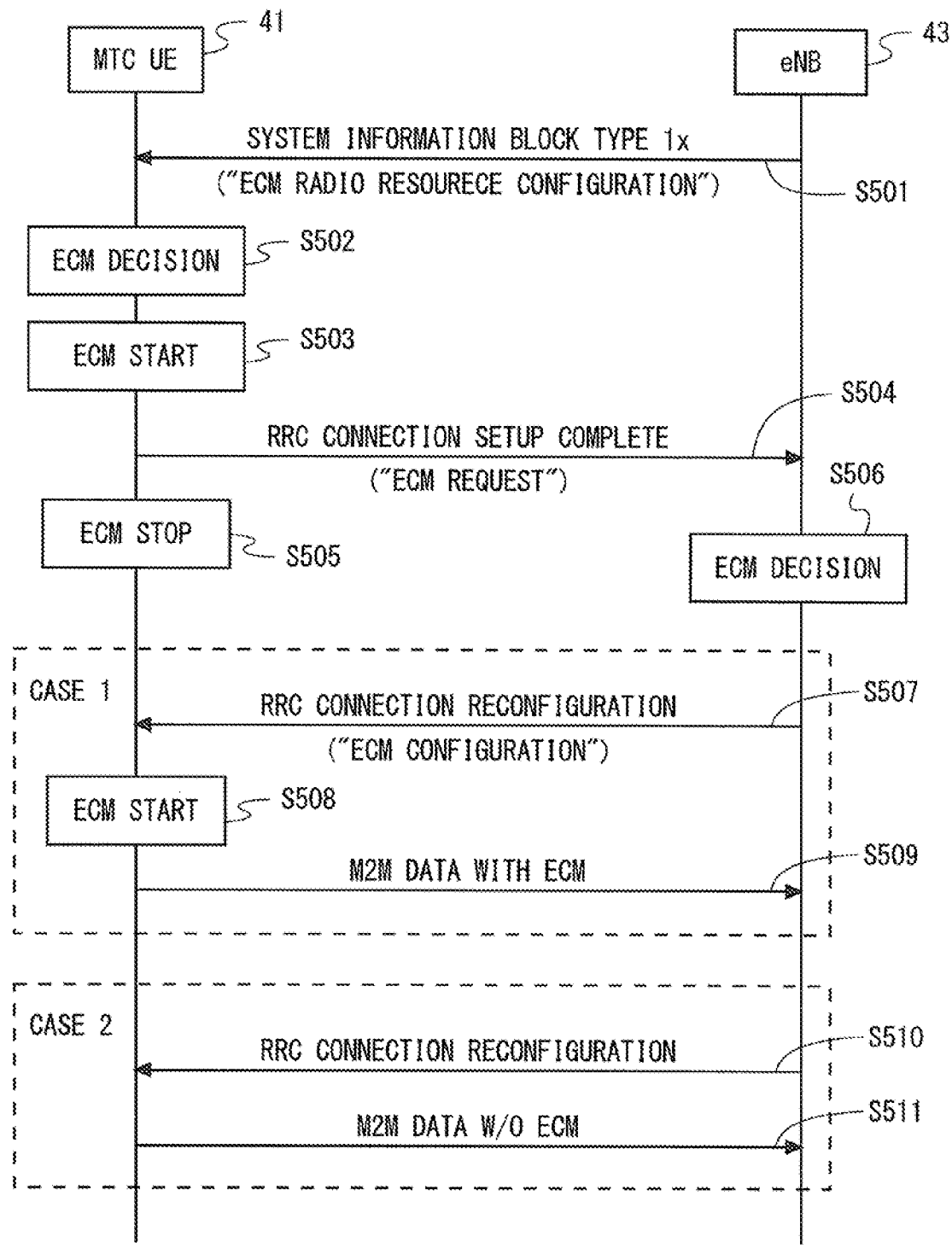
FIG. 6 is a sequence diagram showing one example of communication procedures according to a fourth embodiment.

FIG. 6 is a sequence diagram showing one example of operations of the MTC UE 41 and the eNB 43 according to this embodiment. FIG. 6 shows only the messages that are necessary for explanation of this embodiment and some messages included in the procedure specified in the LTE standard are not shown.

The processes in Steps S501 to S504 in FIG. 6 are similar to those in Steps S401 to S404 in FIG. 5. In Step S505, the MTC UE 41 suspends or stops execution of the ECM (i.e., the coverage enhancement processing in the ECM) after Step S504, that is, after establishment of the RRC connection (ECM Stop).

The process in Step S506 is similar to that in Step S405 of FIG. 5. That is, the eNB 43 determines whether the ECM is necessary for the MTC UE 41 (or whether to execute the ECM for the MTC UE 41) (ECM decision).

Steps S507 to S509 show a case in which the eNB 43 determines that the ECM is necessary (or the ECM is executed) for the MTC UE 41 (case 1 shown in FIG. 6). The process in Step S507 is similar to that in Step S406 in FIG. 5. That is, the eNB 43 transmits radio resource configuration information (Radio Resource Configuration) to the MTC UE 41 (RRC Connection Reconfiguration). In Step S508, the MTC UE 41 starts or re-starts execution of the ECM in response to the instruction from the eNB 43 (ECM start). Then in Step S509, the MTC UE 41 performs data communication using the coverage enhancement processing in the ECM in accordance with the radio resource configuration information and the ECM configuration information (M2M data with ECM).

On the other hand, Steps S510 and S511 show a case the eNB 43 determines that the ECM is not necessary for the MTC UE 41 (case 2 shown in FIG. 6). In Step S510, the eNB 43 transmits radio resource configuration information (Radio Resource Configuration) to the MTC UE 41 (RRC Connection Reconfiguration). The radio resource configuration information in Step S510 may explicitly indicate that the ECM is not executed. In Step S511, the MTC UE 41 performs data communication without using the coverage enhancement processing in the ECM (M2M data without ECM).

Lastly, configuration examples of the MTC UEs and the eNBs according to the above embodiments are described below. Each of the MTC UEs 11, 21, 31, and 41 described in the first to fourth embodiments may include a transceiver to communicate with an eNB and a controller that is coupled to the transceiver. The controller executes the communication control regarding the ECM performed by the MTC UE 11, 21, 31, or 41 described in the first to fourth embodiments.

Each of the eNBs 13, 23, 33, and 43 described in the first to fourth embodiments may include a transceiver to communicate with UEs including MTC UEs and a controller that is coupled to the transceiver. The controller executes the communication control regarding the ECM performed by the eNB 13, 23, 33, or 43 described in the first to fourth embodiments.

Figure 7:
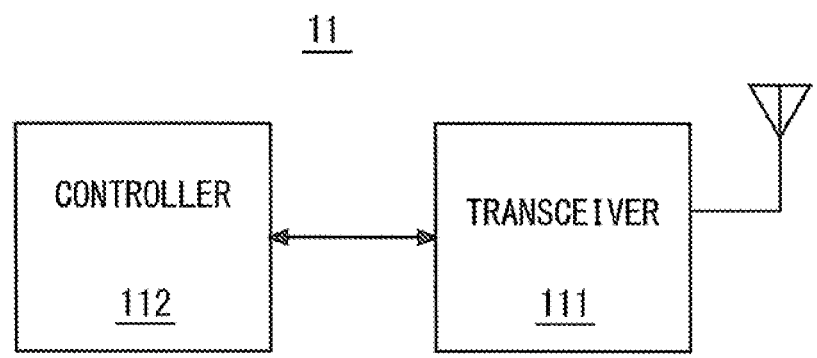
FIG. 7 is a block diagram showing a configuration example of an M2M terminal (MTC UE) according to embodiments of the present invention.
Figure 8:
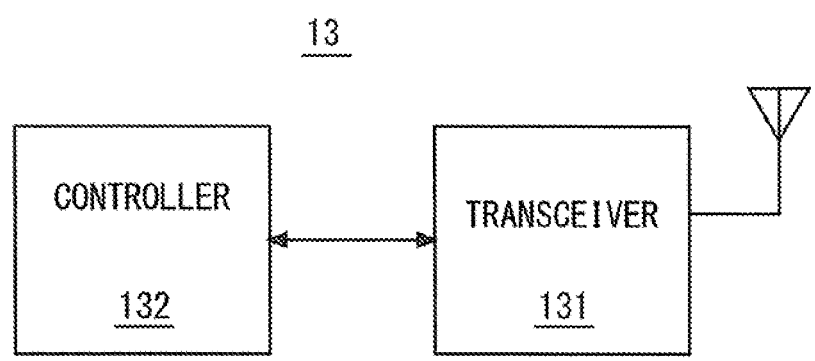
FIG. 8 is a block diagram showing a configuration example of a base station (eNB) according to embodiments of the present invention.

FIGS. 7 and 8 are block diagrams showing configuration examples of the MTC UE 11 and the eNB 13 according to the first embodiment, respectively. With reference to FIG. 7, the MTC UE 11 includes a transceiver 111 and a controller 112. The transceiver 111 is configured to communicate with the eNB 13. The controller 112 is configured to control execution of the coverage enhancement processing regarding the ECM in the MTC UE 11 in accordance with instructions from the eNB 13. Specifically, the controller 112 is configured to receive the first notification from the eNB 13 via the transceiver 111. Further, the controller 112 is configured to transmit the second notification to the eNB 13 via the transceiver 111 when establishing a radio connection (RRC connection) with the eNB 13 after reception of the first notification or while performing a procedure for establishing an EPS bearer after reception of the first notification.

With reference to FIG. 8, the eNB 13 includes a transceiver 131 and a controller 132. The transceiver 131 is configured to communicate with UEs including the MTC UEs 11 and the normal UE 12. The controller 132 is configured to control communication between the MTC UEs 11 and the eNB 13 using the coverage enhancement processing regarding the ECM. Specifically, the controller 132 is configured to transmit the first notification indicating that the specific coverage enhancement processing for the MTC UEs 11 (that is, the coverage enhancement processing in the ECM) is supported in the cell 130 of the eNB 13 via the transceiver 131.

The controllers included in the MTC UEs and the eNBs according to the above embodiments may be implemented by causing a computer including at least one processor (e.g., microprocessor, Micro Processing Unit (MPU), Central Processing Unit (CPU)) to execute a program. Specifically, one or more programs containing set of instructions that causes a computer to perform algorithms regarding the MTC UE or the eNB described using the sequence diagrams and the like may be supplied to the computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The explanations of the aforementioned embodiments have been provided with regard to the situation in which MTC UEs are configured with the special operation mode, i.e., the Enhanced Coverage Mode (ECM) and perform the coverage enhancement processing (e.g., RACH repetition and PDSCH/PUSCH repetition) regarding the ECM. However, the MTC UEs is only required to execute the special coverage enhancement processing (e.g., RACH repetition and PDSCH/PUSCH repetition) and do not have to be configured with the special operation mode (i.e., ECM). In other words, the MTC UEs 11, 21, 31, and 41 may execute the special coverage enhancement processing (e.g., RACH repetition and PDSCH/PUSCH repetition) in accordance with the radio resource configuration without setting the special operation mode such as the ECM or without receiving an instruction regarding the special operation mode.

The explanations of the above embodiments have been provided with regard to the ECM, however the technical ideas described in these embodiments may be applied to a case in which a radio network (e.g., eNB) causes M2M terminals (MTC UEs) to execute special processing other than the ECM.

Further, the terms "normal terminals (UE)" and "M2M terminals (MTC UEs)" used in the above explanation are also referred to as "user terminals" and "non-user terminals", respectively.

Further, in the above embodiments, the LTE system has been mainly described. However, these embodiments may be applied to radio communication systems other than the LTE system (e.g., 3GPP UMTS, 3GPP2 CDMA2000 system (1×RTT, HRPD), GSM/GPRS system, or WiMAX system).

When the aforementioned embodiments are applied to 3GPP UMTS, the operations of the eNB (eNB 13, 23, 33, or 43) according to the embodiments may be performed by a NodeB, an RNC or the combination thereof. In other words, the term "base station" used in the specification and claims means one or more entities installed in a radio access network, for example, any one or combination of a NodeB and an RNC in the UMTS.

Further, the above embodiments are merely examples of applications of the technical ideas obtained by the present inventor. Needless to say, these technical ideas are not limited to the above embodiments and the above embodiments may be modified in various ways.

This application is based upon and claims the benefit of priority from Japanese Patent Application No. 2014-015866, filed on Jan. 30, 2014, the disclosure of which is incorporated herein in its entirety by reference.

REFERENCE SIGNS LIST 11, 21, 31, 41 M2M TERMINAL (MTC UE)
13, 23, 33, 43 BASE STATION (eNB)
14 CORE NETWORK (EPC)
130 CELL
111 TRANSCEIVER
112 CONTROLLER
131 TRANSCEIVER
132 CONTROLLER

The invention claimed is:

1. A method of a User Equipment (UE), the method comprising:
receiving, from a base station, a System Information Block Type 1 (SIB1) message, wherein the SIB1 message includes information indicating that a Coverage Enhancement (CE) is included in features of a cell of the base station;
comparing a Reference Signal Received Power of a downlink with a predetermined threshold; and
sending, to the base station, a random access preamble based on the comparing, wherein the random access preamble is not repeatedly transmitted and implicitly indicates that the CE is required for third step of random access procedure,
wherein the CE is performed by using a specific radio resource configuration causing the UE to perform repeated transmission of the third step of the random access procedure and without being configured with a specific mode at the UE.

2. The method according to claim 1, wherein the third step of the random access procedure is Physical Uplink Shared Channel (PUSCH) transmission for Radio Resource Control (RRC) Connection Setup Request.

3. The method according to claim 1, wherein the sending includes sending the random access preamble using Physical Random Access Channel (PRACH) resources corresponding to the CE.

4. A User Equipment (UE) comprising:
a memory; and
a processor coupled with the memory, wherein the processor is configured to:
receive, from a base station, a System Information Block Type 1 (SIB1) message, wherein the SIB1 message includes information indicating that a Coverage Enhancement (CE) is included in features of a cell of the base station;
compare a Reference Signal Received Power (RSRP) of a downlink with a predetermined threshold; and
send, to the base station, a random access preamble based on comparison of the RSRP with the predetermined threshold, wherein the random access preamble is not repeatedly transmitted and implicitly indicates that the CE is required for third step of random access procedure, wherein the CE is performed by using a specific radio resource configuration causing the UE to perform repeated transmission of the third step of the random access procedure and without being configured with a specific mode at the UE.

5. The UE according to claim 4, wherein the third step of random access procedure is Physical Uplink Shared Channel (PUSCH) transmission for Radio Resource Control (RRC) Connection Setup.

6. The UE according to claim 4, wherein the processor is further configured to send the random access preamble using Physical Random Access Channel (PRACH) resources corresponding to the CE.

7. A method of a base station, the method comprising:

sending, to a User Equipment (UE), a System Information Block Type 1 (SIB1) message, wherein the SIB1 message includes information indicating that a Coverage Enhancement (CE) is included in features of a cell of the base station; and receiving, from the UE, a random access preamble, wherein the random access preamble is transmitted based on a comparison by the UE of a Reference Signal Received Power of a downlink with a predetermined threshold, wherein the random access preamble is not repeatedly transmitted and implicitly indicates that the CE is required for third step of random access procedure, wherein the CE is performed by using a specific radio resource configuration causing the UE to perform repeated transmission of the third step of the random access procedure and without being configured with a specific mode at the UE.

8. The method according to claim 7, wherein the third step of random access procedure is Physical Uplink Shared Channel (PUSCH) transmission for Radio Resource Control (RRC) Connection Setup Request.

9. A base station comprising:

a memory; and a processor coupled with the memory, wherein the processor is configured to:

send, to a User Equipment (UE), a System Information Block Type 1 (SIB1) message, wherein the SIB1 message includes information indicating that a Coverage Enhancement (CE) is included in features of a cell of the base station; and receive, from the UE, a random access preamble, wherein the random access preamble is transmitted based on a comparison by the UE of a Reference Signal Received Power of a downlink with a predetermined threshold, wherein the random access preamble is not repeatedly transmitted and implicitly indicates that the CE is required for third step of random access procedure, wherein the CE is performed by using a specific radio resource configuration causing the UE to perform repeated transmission of the third step of random access procedure and without being configured with a specific mode at the UE.

10. The base station according to claim 9, wherein the third step of random access procedure is Physical Uplink Shared Channel (PUSCH) transmission for Radio Resource Control (RRC) Connection Setup Request.

11. The base station according to claim 9, wherein the processor is further configured to receive the random access preamble using Physical Random Access Channel (PRACH) resources corresponding to the CE.

* * * * *